United States Patent
Zhang et al.

(10) Patent No.: US 11,144,826 B2
(45) Date of Patent: Oct. 12, 2021

(54) POST TOPIC CLASSIFICATION

(71) Applicant: Facebook, Inc., Menlo Park, CA (US)

(72) Inventors: Ying Zhang, Palo Alto, CA (US);
Wenhai Yang, Redwood City, CA (US);
Ou Jin, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 959 days.

(21) Appl. No.: 15/855,946

(22) Filed: Dec. 27, 2017

(65) Prior Publication Data

US 2019/0197399 A1     Jun. 27, 2019

(51) Int. Cl.
| | |
|---|---|
| *G06N 3/08* | (2006.01) |
| *G06F 16/951* | (2019.01) |
| *G06F 16/35* | (2019.01) |
| *G06N 3/04* | (2006.01) |
| *G06N 5/02* | (2006.01) |
| *G06Q 50/00* | (2012.01) |

(52) U.S. Cl.
CPC ............... *G06N 3/08* (2013.01); *G06F 16/35* (2019.01); *G06F 16/951* (2019.01); *G06N 3/0481* (2013.01); *G06N 5/022* (2013.01); *G06Q 50/01* (2013.01)

(58) Field of Classification Search
CPC ....................................................... G06N 3/08
See application file for complete search history.

(56) References Cited

U.S. PATENT DOCUMENTS

| | | | |
|---|---|---|---|
| 2018/0189603 A1* | 7/2018 | Zhang | ............... G06K 9/6223 |
| 2019/0108444 A1* | 4/2019 | Song | ................... G06N 3/0481 |
| 2020/0057612 A1* | 2/2020 | Doyle | ...................... G06F 8/35 |

* cited by examiner

*Primary Examiner* — Moazzam Hossain
(74) *Attorney, Agent, or Firm* — Baker Botts L.L.P.

(57) ABSTRACT

In one embodiment, a method includes accessing an input vector representing an input post, wherein: the vector space comprises clusters each associated with a topic; each cluster was determined based on a clustering of training-page vectors corresponding to training pages that each comprise training posts, each training post submitted by a user to a training page and comprises content selected by the user; and each training-page vector was generated by an ANN that was trained, based on the training posts of training pages associated with the ANN, to receive a post and then output a probability that the received post is related to the training posts of the training pages; determining that the input vector is located within a particular cluster in the vector space; and determining a topic of the input post based on the topic associated with the particular cluster that the input vector is located within.

19 Claims, 7 Drawing Sheets

210 — Shuttle Mariners Fans

220 —
Shuttle Mariners Fans

Mariners acquire Alexander Anthony from the Oakland A's. What move should the Mariners make next?

230 —
Alice Liddel

Giving away baseball signed by Elijah Angel Jr to the biggest fan!

Comments

The Dormouse

Angel is my fav, give to me plz!!!

240 —
Shuttle Mariners Fans

Watch this great video of Brayden's solo homer!

POST TOPIC CLASSIFICATION

TECHNICAL FIELD

This disclosure generally relates to classification using an artificial neural network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, an artificial neural network (ANN) may be trained to determine the topic of a post. The ANN may be trained based on a corpus of training pages each comprising training posts. The ANN may receive an input vector representing a post and output a topic of the input post. In particular embodiments, users may submit posts to pages, which may result in the posts of a page having a similar topic. A plurality of ANNs (also called ANN shards) may be trained. Each of the ANNs may be trained based on a plurality of training pages. Common pages may be training pages used to train each of the ANNs. The resulting training-page vectors output by the ANNs may be mapped to a common vector space based on a mapping determined by the vectors representing the common pages. The training-page vectors may be clustered and a topic of an input post may be determined based on determining which cluster the vector representing the input post is within.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, an artificial neural network (ANN) may be trained to determine the topic of a post. The ANN may be trained based on a corpus of training pages each comprising training posts. The ANN may receive an input vector representing a post and output a topic of the input post. In particular embodiments, users may submit posts to pages, which may result in the posts of a page having a similar topic. A plurality of ANNs (also called ANN shards) may be trained. Each of the ANNs may be trained based on a plurality of training pages. Common pages may be training pages used to train each of the ANNs. The resulting training-page vectors output by the ANNs may be mapped to a common vector space based on a mapping determined by the vectors representing the common pages. The training-page vectors may be clustered and a topic of an input post may be determined based on determining which cluster the vector representing the input post is within.

Figure 1:
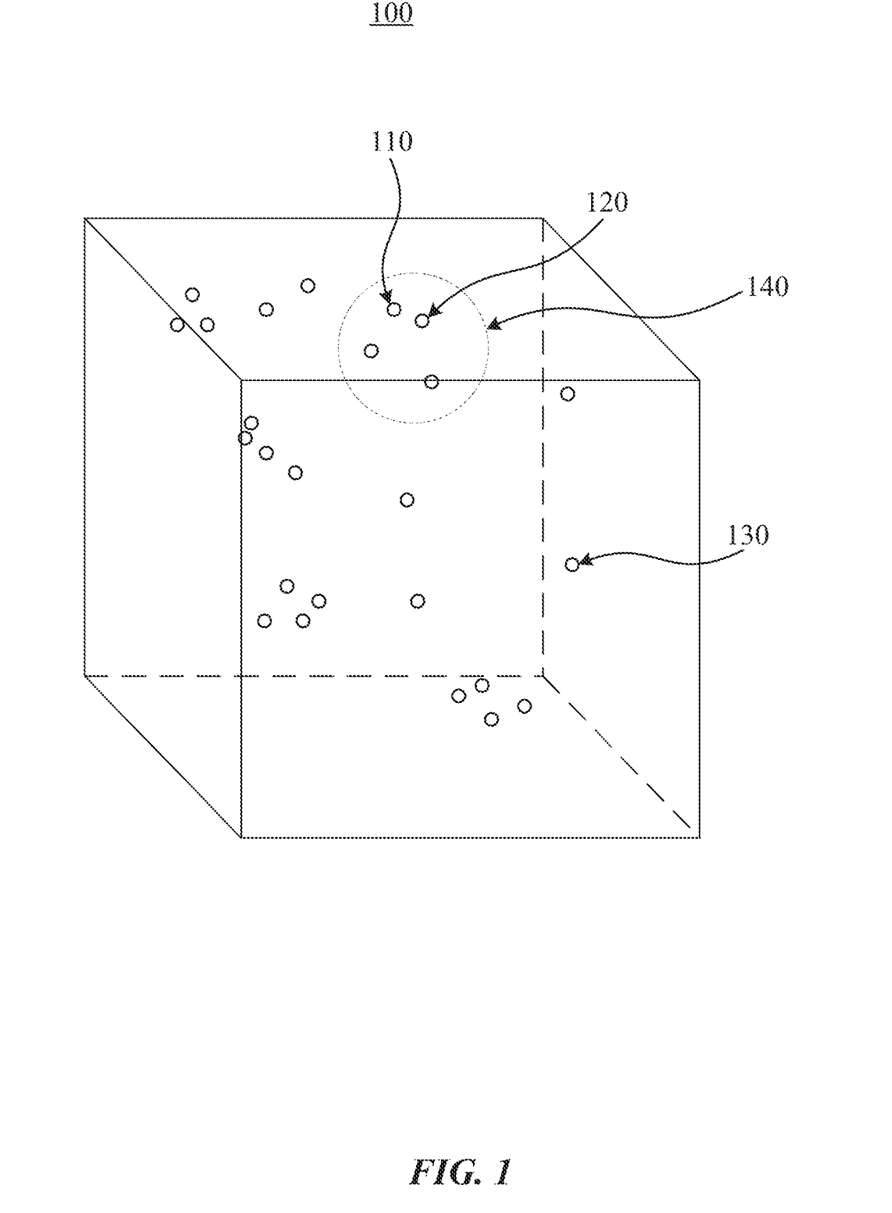
FIG. 1 illustrates an example view of a vector space.

FIG. 1 illustrates an example view of a vector space 100. Vector space 100 may also be referred to as a feature space or an embedding space. In particular embodiments, an object or an n-gram may be represented in a d-dimensional vector space, where d denotes any suitable number of dimensions. Although the vector space 100 is illustrated as a three-dimensional space, this is for illustrative purposes only, as the vector space 100 may be of any suitable dimension. In particular embodiments, an n-gram may be represented in the vector space 100 as a vector. Each vector may comprise coordinates corresponding to a particular point in the vector space 100 (i.e., the terminal point of the vector). As an example and not by way of limitation, vectors 110, 120, and 130 may be represented as points in the vector space 100, as illustrated in FIG. 1. In particular embodiments, a mapping from data to a vector may be relatively insensitive to small changes in the data (e.g., a small change in the data being mapped to a vector will still result in approximately the same mapped vector). In particular embodiments, social-networking system 560 may map objects of different modalities to the same vector space or use a function jointly trained to map one or more modalities to a feature vector (e.g., between visual, audio, text). Although this disclosure may describe a particular vector space, this disclosure contemplates any suitable vector space.

In particular embodiments, an n-gram may be mapped to a respective vector representation. As an example and not by way of limitation, n-grams $t_1$ and $t_2$ may be mapped to vectors $\vec{v_1}$ and $\vec{v_2}$ in the vector space 100, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 100. In particular embodiments, an n-gram may be mapped to a vector representation in the vector space 100 by using a machine leaning model (e.g., a neural network). The machine learning model may have been trained using training data (e.g., a corpus of objects each comprising n-grams). Although this disclosure describes representing an n-gram in a vector space in a particular manner, this disclosure contemplates representing an n-gram in a vector space in any suitable manner.

In particular embodiments, an object may be represented in the vector space 100 as a vector. As an example and not by way of limitation, objects $e_1$ and $e_2$ may be mapped to vectors $\vec{v_i}$ and $\vec{v_2}$ in the vector space 100, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector (e) based on one or more n-grams associated with object e. In particular embodiments, an object may be mapped to a vector by using a machine learning model. Although this disclosure describes representing an object in a vector space in a particular manner, this disclosure contemplates representing an object in a vector space in any suitable manner.

In particular embodiments, social-networking system 560 may calculate a similarity metric of vectors in vector space 100. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \|\vec{v_2}\|}.$$

As another example and not by way of limitation, a similarity metric of $\vec{v_i}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 100. As an example and not by way of limitation, vector 110 and vector 120 may correspond to objects that are more similar to one another than the objects corresponding to vector 110 and vector 130, based on the distance between the respective vectors. In particular embodiments, social-networking system 560 may determine a cluster of vector space 100. A cluster may be a set of one or more points corresponding to feature vectors of objects or n-grams in vector space 100, and the objects or n-grams whose feature vectors are in the cluster may belong to the same class or have a relationship to one another (e.g., a semantic relationship, a visual relationship, a topical relationship, etc.). As an example and not by way of limitation, cluster 140 may correspond to sports-related content and another cluster may correspond to food-related content. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Figure 2:
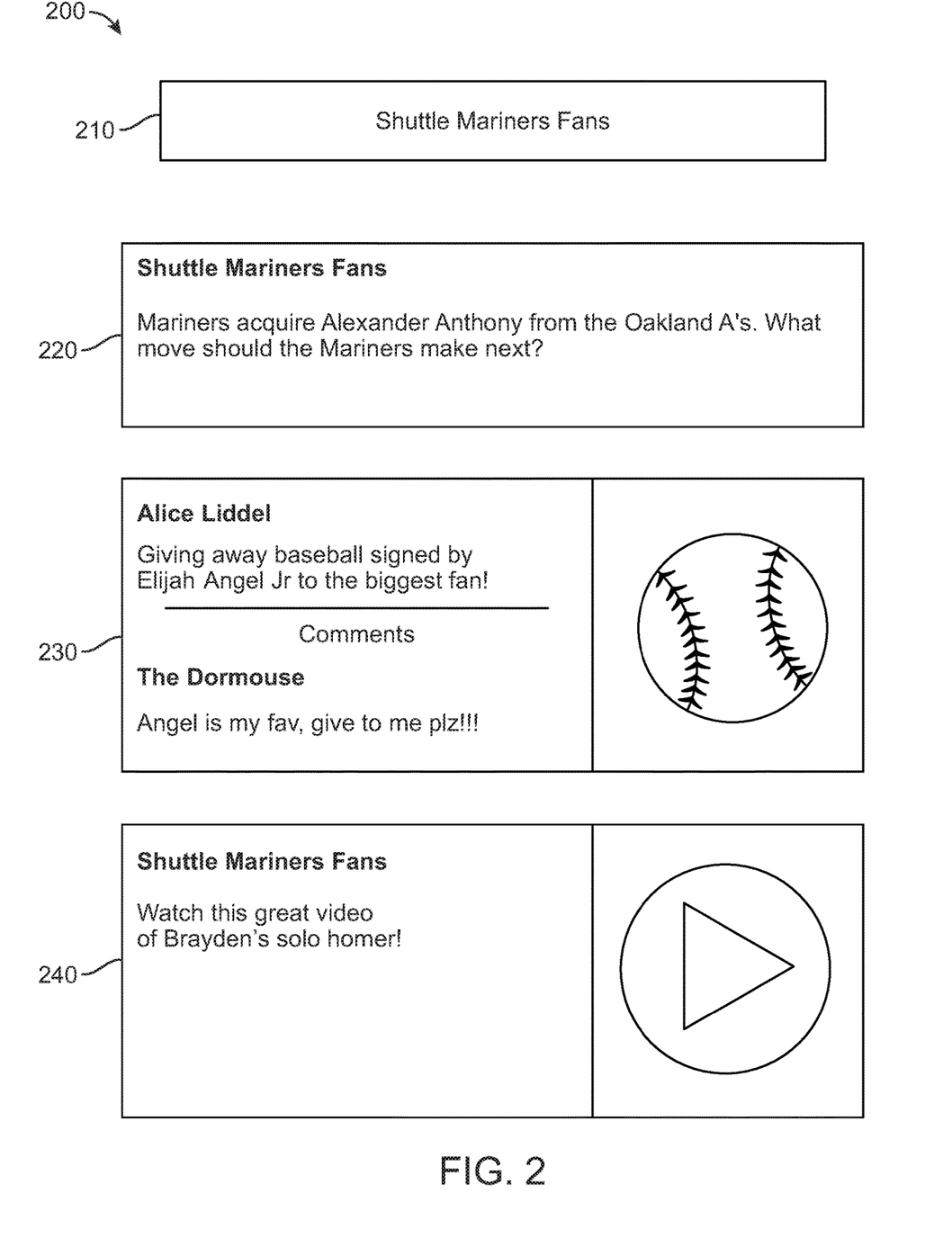
FIG. 2 illustrates an example page.

FIG. 2 illustrates an example page 200. In particular embodiments, a page may comprise one or more posts. As an example and not by way of limitation, page 200 comprises posts 220, 230, and 240. In particular embodiments, a post may comprise one or more n-grams, one or more videos, or one or more images. As an example and not by way of limitation, post 220 may comprise one or more n-grams (e.g., "Mariners acquire Danny Valencia from the Oakland A's. What move should the Mariners make next?"). As another example and not by way of limitation, post 230 may comprise one or more n-grams and an image of a baseball. As another example and not by way of limitation, post 240 may comprise a video. Although this disclosure may describe particular posts of particular pages, this disclosure contemplates any suitable post and any suitable page.

In particular embodiments, a post may have been submitted by a user to a page and comprise content selected by the user. As an example and not by way of limitation, the content of post 220 may have been submitted by the user "Seattle Mariners Fans" to the Seattle Mariners Fans page. In particular embodiments, a post may comprise comments. Additionally or alternatively, comments on a post may be considered separately from each other and the original post. As an example and not by way of limitation, post 230 may comprise the text content "Giving away baseball signed by Ken Griffey Jr to the biggest fan!" and an image of a baseball submitted by user Alice Liddel. The user "The Dormouse"

may submit a comment to that post comprising the text "Griffey is my fav, give to me plz!!!" The post by Alice Liddel and the post by The Dormouse may be considered as two separate posts, considered together as one post, or only the post by Alice Liddel may be considered while the comment by The Dormouse may be considered as non-post content. In particular embodiments, a user may select content of a post by generating the content, linking to the content, selecting pre-generated content, or in any other suitable manner. Although this disclosure may describe particular posts with particular content, this disclosure contemplates any suitable post comprising any suitable content.

In particular embodiments, a page may correspond to a label comprising one or more n-grams. As an example and not by way of limitation, page 200 may correspond to the label 210 "Seattle Mariners Fans." In particular embodiments, the label may be a user-generated label that relates to the content of the page. As an example and not by way of limitation, page 200 may be a user created page on a social-networking system 560. The user who created page 200 may have selected the label "Seattle Mariners Fans" and page 200 may be a page where fans of the Seattle Mariners baseball team may view, post, or interact with content. In particular embodiments, posts on page 200 may relate to label 210. As an example and not by way of limitation, users who post on page 200 may tend to submit posts to page 200 that relate to the label 210 (e.g., users who want to post Seattle Mariners-related content may self-select page 200 to post related content). As another example and not by way of limitation, an administrator of a page may remove off-topic posts from the page and retain posts that are related to label 210 (e.g., a post unrelated to the Seattle Mariners may be removed from page 200 by an administrator of page 200). Although this disclosure describes particular posts on particular pages with a particular label, this disclosure contemplates any suitable post of any suitable page corresponding to any suitable label.

In particular embodiments, an artificial neural network (ANN) may refer to a computational model comprising one or more nodes. In particular embodiments, each node of an ANN may be connected to another node of the ANN. In particular embodiments, one or more nodes may be a bias node (e.g., a node in a layer that is not connected to and does not receive input from any node in a previous layer). In particular embodiments, an ANN may comprise an input layer, one or more hidden layers, and an output layer. Each layer of the ANN may comprise one or more nodes. In particular embodiments, each node in each layer may be connected to one or more nodes of a previous or subsequent layer. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1+e^{-s_k}}$$

or the hyperbolic tangent function $$F_k(s_k) = \frac{e^{s_k}-e^{-s_k}}{e^{s_k}+e^{-s_k}},$$

where $s_k$ may be the effective input to node k. In particular embodiments, the input of an activation function corresponding to a node may be weighted. Each node may generate output using a corresponding activation function based on weighted inputs. In particular embodiments, an ANN may be a feedforward ANN (e.g., an ANN with no cycles or loops where communication between nodes flows in one direction beginning with the input layer and proceeding to successive layers). As an example and not by way of limitation, the input to each node of a hidden layer of the ANN subsequent to an input layer of the ANN may comprise the output of one or more nodes of the previous layer of the ANN. As another example and not by way of limitation, the input to each node of an output layer of the ANN may comprise the output of one or more nodes of a previous hidden layer of the ANN. In particular embodiments, each connection between nodes may be associated with a weight. As an example and not by way of limitation, a connection between a first node and a second node may have a weighting coefficient of 0.4, which may indicate that 0.4 multiplied by the output of the first node is used as an input to the second node. As another example and not by way of limitation, the output $y_k$ of node k may be $y_k(t+1)=F_k(y_k(t), s_k(t))$, where $F_k$ may be the activation function corresponding to node k, $s_k(t)=\Sigma_j (w_{jk}(t)x_j(t)+b_k(t))$ may be the effective input to node k, $x_j(t)$ may be the output of a node j connected to node k, $w_{jk}$ may be the weighting coefficient between node j and node k, and $b_k$ may be an offset parameter. In particular embodiments, the input to nodes of an input layer of the ANN may be based on the data input into the ANN. As an example and not by way of limitation, the ANN may receive a vector as input and the input to nodes of the input layer may be based on the elements of the vector. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an artificial neural network may be trained to categorize a post. A post may be categorized by determining a semantic meaning, a topic, a label, or any other suitable categorization. In particular embodiments, the ANN may be trained based on a plurality of training pages, each training page comprising one or more training posts. As an example and not by way of limitation, a particular number of training pages may be selected and used to train the ANN. As another example and not by way of limitation, pages with at least a threshold number of training posts (e.g., at least 30 training posts) may be selected and used to train the ANN. Although this disclosure describes training an ANN using particular pages or posts, this disclosure contemplates training an ANN using any suitable pages or any suitable posts.

In particular embodiments, social-networking system 560 may access an input vector representing an input post. As an example and not by way of limitation, social-networking system 560 may access an input vector representing an input post by accessing an input post and determining a vector representing the input post based on the content of the input post (e.g., using an ANN). As another example and not by way of limitation, social-networking system 560 may access a pre-determined input vector representing an input post without accessing the input post. In particular embodiments, the input vector representing the input post may correspond to a point in a d-dimensional vector space. Although this disclosure describes accessing an input vector in a particular manner, this disclosure contemplates accessing an input vector is any suitable manner.

In particular embodiments, the vector space may comprise a plurality of clusters that are each associated with a topic. In particular embodiments, a cluster may refer to a grouping of vectors in the vector space. The cluster may define membership criteria (e.g., a set of rules to determine whether a particular vector is a member of the cluster). As an example and not by way of limitation, each cluster may be represented as a centroid and a vector may be a member of a particular cluster if the vector is closer to the centroid of the particular cluster than the centroid of any other cluster. In particular embodiments, a cluster may be visualized, represented, or defined by a boundary in the vector space. As an example and not by way of limitation, referencing FIG. 1, cluster 140 may be visualized as a sphere, where vectors on the interior are members of the cluster and vectors on the exterior are not members (e.g., vectors 110 and 120 may be members of the cluster and vector 130 may not be a member of the cluster). In particular embodiments, a topic may refer to a category, a subject, a property, a concept, a semantic meaning, or an epistemological potential. As an example and not by way of limitation, a cluster may be associated with the topic "baseball," the topic "food," the topic "sports," the topic "local news," or any other suitable topic. In particular embodiments, the clusters may be mutually exclusive (e.g., a vector may be a member of at most one cluster). In particular embodiments, the clusters may not be mutually exclusive. As an example and not by way of limitation, a vector may be a member of a cluster associated with the topic "sports" and a member of a cluster associated with the topic "baseball." Each point in the vector space may be within a cluster, or there may exist at least one point in the vector space that is not within any cluster. Although this disclosure describes particular clusters or topics, this disclosure contemplates any suitable clusters and any suitable topics.

In particular embodiments, each cluster may be determined based on a clustering of a plurality of training-page vectors corresponding to a plurality of respective training pages that each comprise one or more training posts. Clustering the plurality of training-page vectors may refer to a cluster analysis of the training-page vectors to determine the clusters. As an example and not by way of limitation, a k-means clustering analysis, a hierarchical clustering analysis, a distribution-based clustering analysis, a density-based clustering analysis, or any other suitable clustering analysis may be used to determine clusters based on the training-page vectors. In particular embodiments, a clustering analysis may determine a particular number of clusters. As an example and not by way of limitation, a clustering analysis may be used to determine 5,000 clusters. In particular embodiments, a clustering analysis may refine cluster assignments through repeated subdivision until a criterion is met. As an example and not by way of limitation, a clustering analysis may continue to subdivide cluster assignments until a subsequent subdivision results in a model with a higher Bayesian information criterion than the previously subdivided model. In particular embodiments, each training post may have been submitted by a user to a training page and comprise content selected by the user. As an example and not by way of limitation, referencing FIG. 2, page 200 may be a training page and post 220 may be a training post of training page 200. Post 220 may have been submitted by the user "Seattle Mariners Fans" to page 200 and post 220 may comprise content selected by the user "Seattle Mariners Fans." Although this disclosure describes particular clustering using a particular clustering analysis, this disclosure contemplates any suitable clustering using any suitable clustering analysis.

In particular embodiments, each training-page vector may be generated by an ANN that was trained, based on the training posts of training pages associated with the ANN, to receive a post and then output, for each training page, a probability that the received post is related to the training posts of the training page. As an example and not by way of limitation, the ANN may be trained such that a layer (e.g., an output layer) of the ANN comprises nodes corresponding to the training pages. For a received post, the ANN may output a binary decision of the received post for each training page as to whether the received post is related to the training posts of the training page. As another example and not by way of limitation, the ANN may output, for each training page, a probability that a received post is related to the training page (e.g., a probability from 0 to 1.0). As another example and not by way of limitation, the ANN may output a rank for each training page indicating which of the training pages comprise training posts most similar to the received post (e.g., the received post is most related to the top ranked training page, least similar to the bottom ranked training page, etc.). As another example and not by way of limitation, the ANN may comprise a projection matrix. The projection matrix may comprise weights assigned to each element of a vector representing a received post for each training page. Each column of the projection matrix may represent a training page. For a training page i, the activation $A_i = w_i \times H$, where $w_i$ may be a weight vector corresponding to training page i and H may be the vector representing the received post. The value of $A_i$ may represent the probability that the received post is related to training page i. In particular embodiments, a page vector representing a page may comprise a hidden layer of the ANN that generated the page vector. The projection matrix may be the matrix that transforms the hidden layer to the output layer. In particular embodiments, the probability that the received post is related to the training posts of the training page may comprise a probability that the received post is semantically related to the training posts of the training page. Although this disclosure describes particular probabilities outputted by a particular ANN trained in a particular manner, this disclosure contemplates any suitable probability outputted by any suitable ANN trained in any suitable manner.

Figure 3:
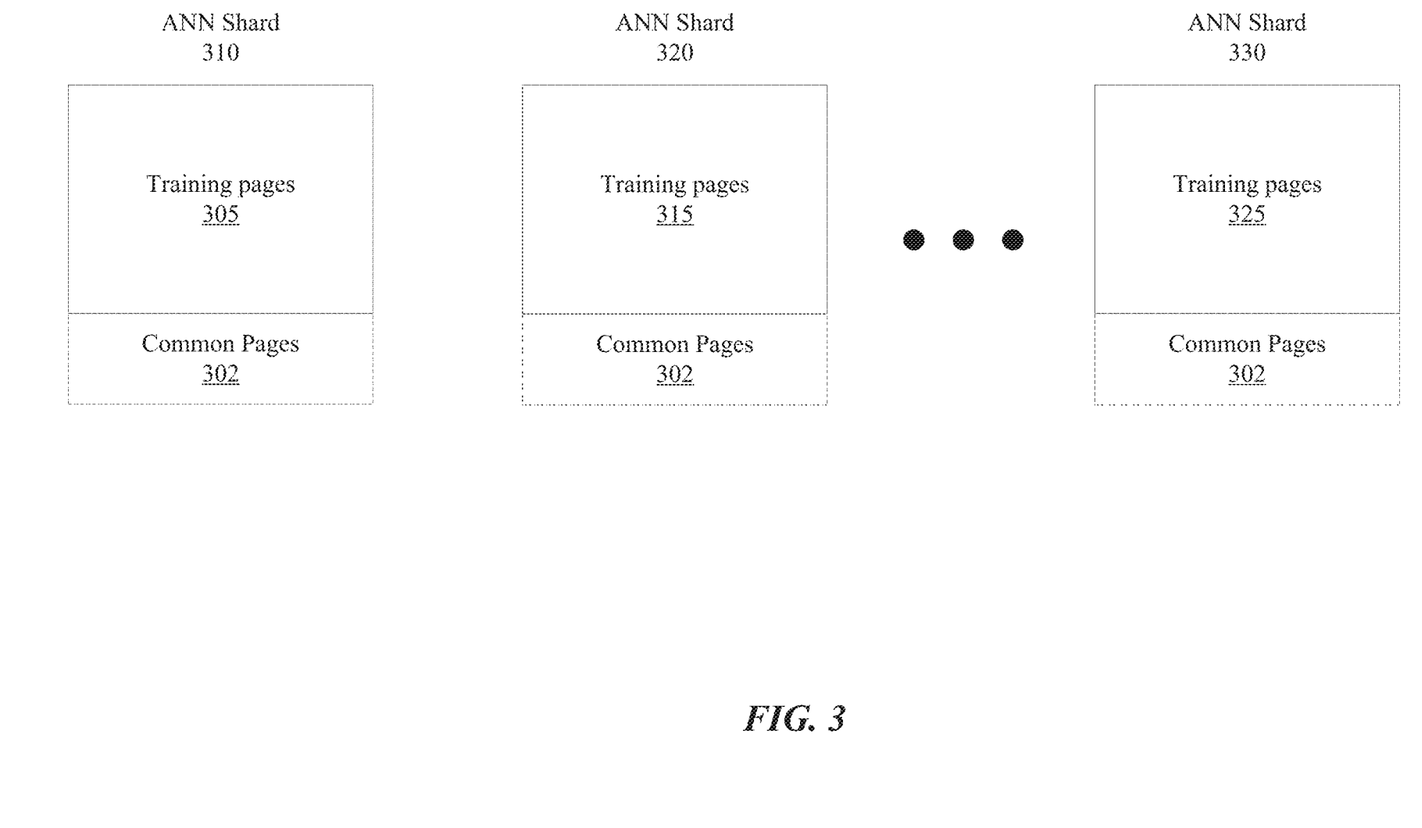
FIG. 3 illustrates an example plurality of artificial neural networks.

FIG. 3 illustrates an example plurality of ANNs. In particular embodiments, the plurality of training-page vectors may be generated by a plurality of ANNs. As an example and not by way of limitation, ANN shard 310, ANN shard 320, and ANN shard 330 may each correspond to a different ANN. Each ANN may be associated with one or more of the training pages. As an example and not by way of limitation, ANN shard 310 may be associated with training pages 305, ANN shard 320 may be associated with training pages 315, and ANN shard 330 may be associated with training pages 325. In particular embodiments, each ANN may be trained, based on the training posts of the training pages associated with the ANN, to receive a post and output, for each associated training page, a probability that the post is related to the training posts of the training page. As an example and not by way of limitation, ANN shard 310 may be trained based on the training posts of training pages 305 to output a probability that a received post is related to the training posts of each training page of training pages 305. Each ANN may be trained separately from one another. In particular embodiments, one or more of the training pages may be common pages associated with all of the ANNs. As an example and not by way of limitation, one or more training pages in FIG. 3 may be common pages 302. Training pages 305 may comprise common pages 302, training pages 315 may comprise common pages 302, and training pages 325 may comprise common pages 302. Although this disclosure describes a particular plurality of ANNs associated with particular training pages, this disclosure contemplates using any suitable number of any suitable ANNs associated with any suitable training pages.

Training-page vectors generated by a plurality of ANNs may be mapped to a common vector space of a particular one of the ANNs. For each training page associated with the particular ANN, the particular ANN may generate a training-page vector representing the training page. For each training page associated with each other ANN corresponding to a respective other vector space, the other ANN may generate an intermediate-page vector representing the training page. For each of the other ANNs, a mapping from the other vector space corresponding to the other ANN to the particular vector space corresponding to the particular ANN may be determined based on the training-page vectors representing the common pages generated by the particular ANN and the intermediate-page vectors representing the common pages generated by the other ANN. As an example and not by way of limitation, ANN shard 310 may be the particular ANN. ANN shard 310 may generate training-page vectors representing the common pages 302. ANN shard 320 may generate intermediate-page vectors representing the common pages 302. A mapping to the particular vector space corresponding to ANN shard 310 from the other vector space corresponding to ANN shard 320 may be determined based on the vectors representing the common pages. As an example and not by way of limitation, $P_{i,j}$ may be the vector representing common page i output by ANN shard j. A mapping of common page 1 from ANN shard 2 to ANN shard 1 may be the mapping $P_{1,1}=E_2 \times P_{1,2}$, where $\vec{E}_2$ may be a transformation that minimizes the error for the vectors representing the common pages from ANN shard 2 to ANN shard 1 (e.g., a transformation that minimizes a least square error). In particular embodiments, for each intermediate-page vector, a training-page vector may be generated by mapping the intermediate-page vector to the vector space using the determined mapping from other vector space corresponding to the other ANN that generated the intermediate-page vector to the vector space. Although this disclosure describes generating page vectors using a plurality of ANNs in a particular manner, this disclosure contemplates generating page vectors using a plurality of ANNs in any suitable manner.

In particular embodiments, social-networking system 560 may determine that the input vector representing the input post is located within a particular cluster in the vector space. In particular embodiments, social-networking system 560 may determine a topic of the input post based on the topic associated with the particular cluster that the input vector is located within. As an example and not by way of limitation, an input vector may represent a post comprising the text "watching the Seattle Mariners play against the Houston Astros #truetotheblue #sorryhouston". Further, there may be 5,000 clusters in the vector space, associated with topics such as "restaurants," "video games," and "baseball." Social-networking system may determine that the input vector is located within a particular one of the 5,000 clusters in the vector space associated with the topic "baseball." Although this disclosure describes determining a topic of an input post a particular manner, this disclosure contemplates determining a topic of an input post in any suitable manner.

In particular embodiments, determining a topic of the input post may comprise determining a representative label of the training pages located in the cluster associated with the topic. As an example and not by way of limitation, each cluster may be manually assigned a representative label by a user based on the training pages located in the cluster. In particular embodiments, each cluster may be automatically assigned a label based on an analysis of the training pages located within the cluster. As an example and not by way of limitation, a representative label may be determined for a cluster based on the one or more n-grams most frequent among the training pages location within the cluster. As another example and not by way of limitation, 500 training posts may be located in a particular cluster. The training posts in the cluster may include labels such as "Food snobs," "food recipes," "delicious eats," and "burgers." The most common n-gram among the labels of the training pages may be "food," which may be determined as a representative label of the cluster. In particular embodiments, determining a topic of an input post may comprise determining that the vector representing the input post is located in a particular cluster without a representative label. In particular embodiments, determining the topic of a post may comprise determining a topic associated with a maximum probability value compared to other topics (e.g., the topic associated with $i^*=\text{argmax}_i(T_i)$, where $T_i$ may be the probability that the input post is related to topic i). Although this disclosure describes determining a topic in a particular manner, this disclosure contemplates determining a topic in any suitable manner.

In particular embodiments, social-networking system 560 may determine that a user is interacting with the input post. As an example and not by way of limitation, social-networking system 560 may determine that a user is viewing the input post, editing the input post, commenting on the input post, submitting the input post, or otherwise interacting with the input post. In particular embodiments, social-networking system 560 may provide, for display to the user, content associated with the topic of the input post. As an example and not by way of limitation, social-networking system may determine that a user is viewing the input post and display recommended posts that have the same topic as the input post. As another example and not by way of limitation, social-networking system 560 may determine that the user has posted the input post and provide an advertisement for display to the user that corresponds to a vector in the same cluster as the input post. Although this disclosure describes determining user interaction and providing content for display to a user in a particular manner, this disclosure contemplates determining user interaction and providing content for display to a user in any suitable manner.

In particular embodiments, social-networking system 560 may rank the input post with respect to a user based at least in part on the determined topic of the input post. Social-networking system 560 may provide, for display to the user, the input post based on determining that the rank is at least a threshold rank. As an example and not by way of limitation, a user may be associated with a user profile. The user profile of the user may indicate that the user is interested in particular topics, and may indicate an intensity of interest in those topics. An input post may be ranked based on the determine topic of the input post (e.g., input posts with determined topics that the user is interested may be ranked higher than input posts with topics the user is not interested in). Although this disclosure describes ranking input posts based on a determined topic in a particular manner, this disclosure contemplates ranking input posts based on a determined topic in any suitable manner.

In particular embodiments, the input post may be submitted by an advertiser on an online social network and may be associated with an advertisement campaign related to a topic. As an example and not by way of limitation, a beverage company advertiser may submit an input post associated with an advertisement for a soft drink. The input post may be associated with an advertisement related to the topic "beverage." In particular embodiments, social-networking system 560 may determine that the topic of the input post is not related to the topic of the advertisement campaign. As an example and not by way of limitation, the beverage company advertiser may submit an advertisement featuring a pill bottle and the text "miracle cure for any health condition." Social-networking system 560 may determine that this input post is related to the topic "dietary supplement" and not the topic "beverage." In particular embodiments, social-networking system 560 may send, to an administrator of the online social network, an indication that the input post is not related to the topic of the advertisement campaign. In particular embodiments, sending an indication that the input post is not related to the topic of the advertisement campaign may allow an administrator to review the input post and determine whether the input post comprises fraud or other material that should be removed. As an example and not by way of limitation, an advertiser may receive approval for particular advertisement campaign, but change the advertisements to inappropriate advertisements after approval. In particular embodiments, social-networking system 560 may automatically suspend the advertisement campaign upon determining that the input post topic is unrelated until an administrator determines that the advertisement campaign may be unsuspended. Although this disclosure describes a particular response to determining that a topic of an input post comprising an advertisement does not match the topic of an advertisement campaign, this disclosure contemplates any suitable response to determining that a topic of an input post comprising an advertisement does not match the topic of an advertisement campaign.

Figure 4:
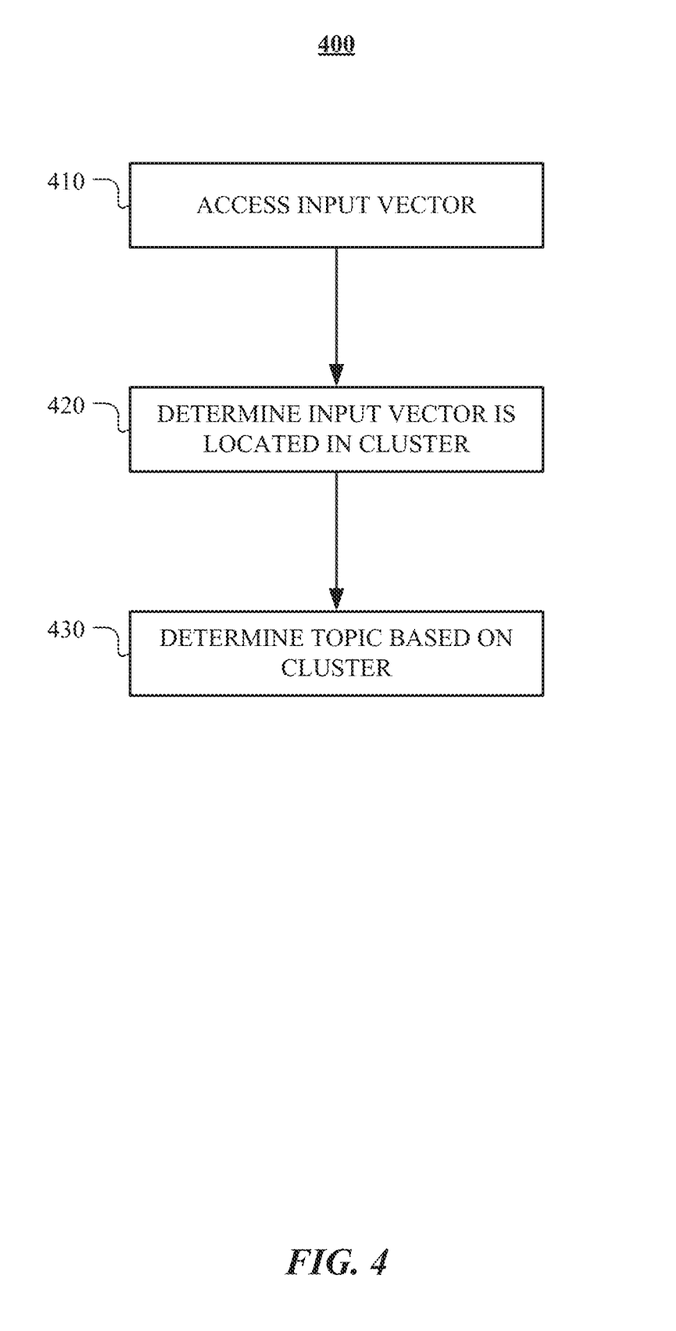
FIG. 4 illustrates an example method for determining the topic of a post.

FIG. 4 illustrates an example method 400 for determining the topic of a post. The method may begin at step 410, where social-networking system 560 may access an input vector representing an input post, wherein the input vector corresponds to a point in a d-dimensional vector space; the vector space comprises a plurality of clusters that are each associated with a topic; each cluster was determined based on a clustering of a plurality of training-page vectors corresponding to a plurality of respective training pages that each comprise one or more training posts, wherein each training post was submitted by a user to a training page and comprises content selected by the user; and each training-page vector was generated by an ANN that was trained, based on the training posts of training pages associated with the ANN, to receive a post and then output, for each training page, a probability that the received post is related to the training posts of the training page. At step 420, social-networking system 560 may determine that the input vector representing the input post is located within a particular cluster in the vector space. At step 430, social-networking system 560 may determine a topic of the input post based on the topic associated with the particular cluster that the input vector is located within. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for determining the topic of a post including the particular steps of the method of FIG. 4, this disclosure contemplates any suitable method for determining the topic of a post including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
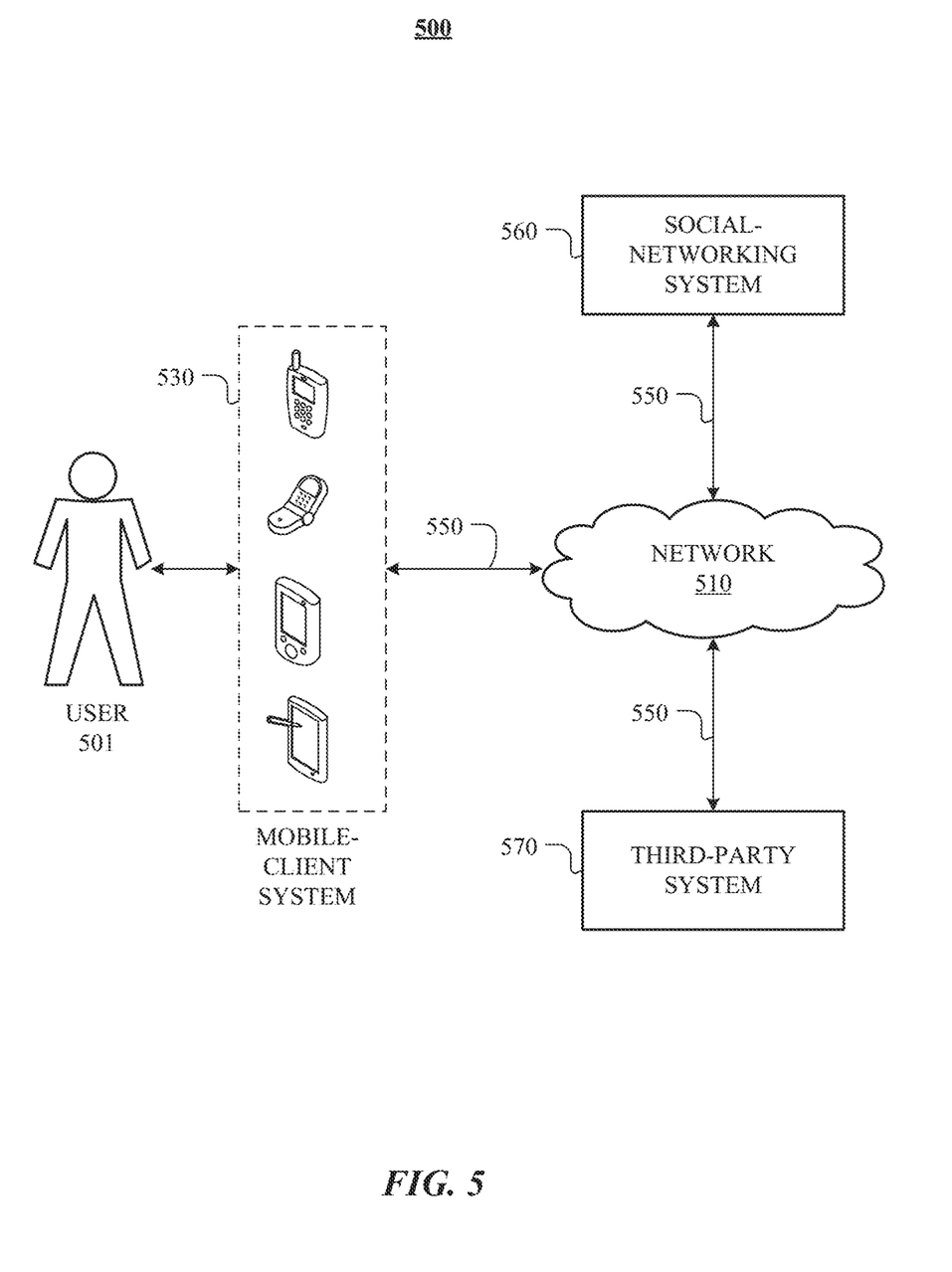
FIG. 5 illustrates an example network environment associated with a social-networking system.

FIG. 5 illustrates an example network environment 500 associated with a social-networking system. Network environment 500 includes a user 501, a client system 530, a social-networking system 560, and a third-party system 570 connected to each other by a network 510. Although FIG. 5 illustrates a particular arrangement of user 501, client system 530, social-networking system 560, third-party system 570, and network 510, this disclosure contemplates any suitable arrangement of user 501, client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of users 501, client systems 530, social-networking systems 560, third-party systems 570, and networks 510, this disclosure contemplates any suitable number of users 501, client systems 530, social-networking systems 560, third-party systems 570, and networks 510. As an example and not by way of limitation, network environment 500 may include multiple users 501, client system 530, social-networking systems 560, third-party systems 570, and networks 510.

In particular embodiments, user 501 may be an individual (human user), an entity (e.g., an enterprise, business, or third-party application), or a group (e.g., of individuals or entities) that interacts or communicates with or over social-networking system 560. In particular embodiments, social-networking system 560 may be a network-addressable computing system hosting an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. In particular embodiments, social-networking system 560 may include an authorization server (or other suitable component(s)) that allows users 501 to opt in to or opt out of having their actions logged by social-networking system 560 or shared with other systems (e.g., third-party systems 570), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. Third-party system 570 may be accessed by the other components of network environment 500 either directly or via network 510. In particular embodiments, one or more users 501 may use one or more client systems 530 to access, send data to, and receive data from social-networking system 560 or third-party system 570. Client system 530 may access social-networking system 560 or third-party system 570 directly, via network 510, or via a third-party system. As an example and not by way of limitation, client system 530 may access third-party system 570 via social-networking system 560. Client system 530 may be any suitable computing device, such as, for example, a personal computer, a laptop computer, a cellular telephone, a smartphone, a tablet computer, or an augmented/virtual reality device.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

Figure 6:
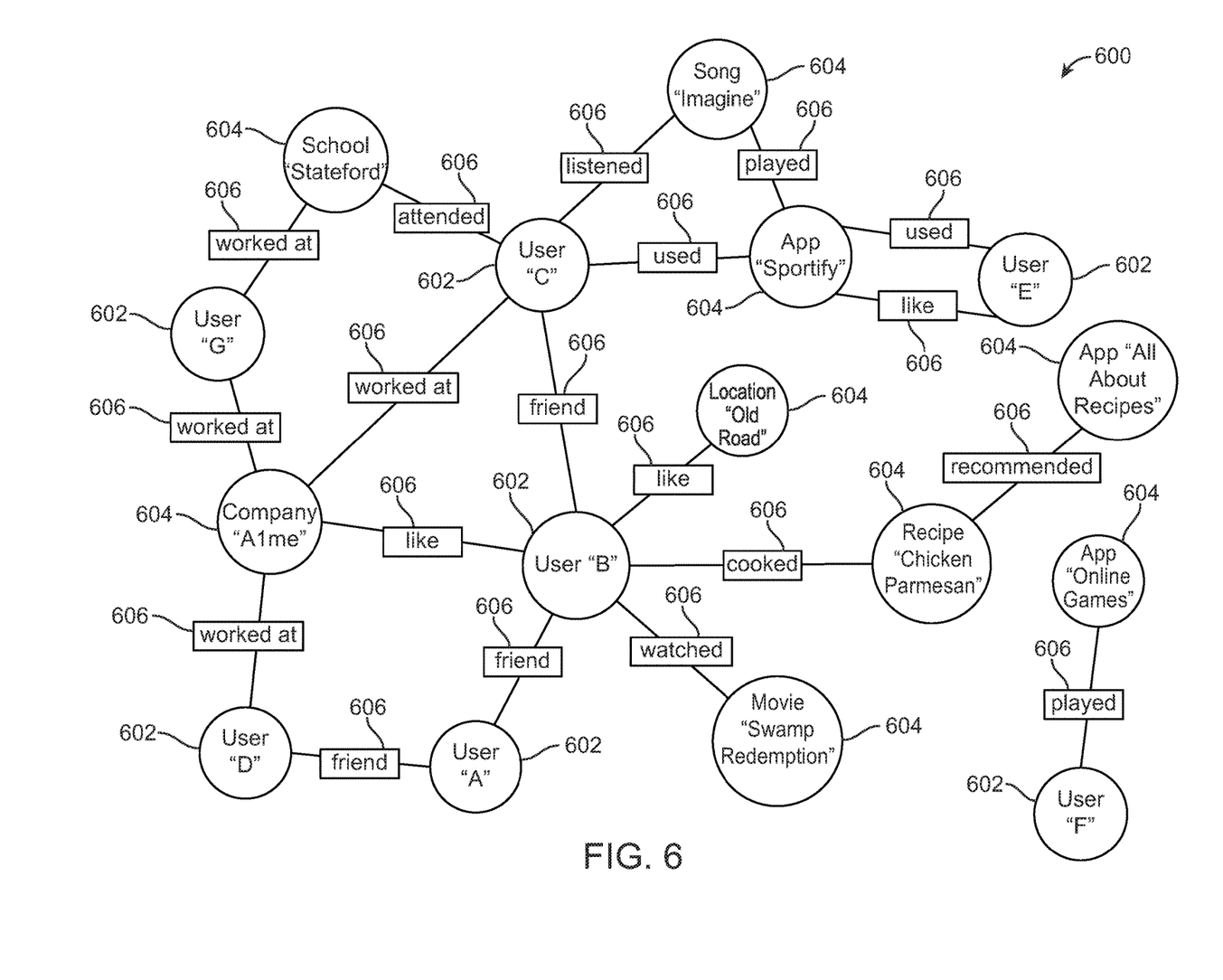
FIG. 6 illustrates an example social graph.

FIG. 6 illustrates example social graph 600. In particular embodiments, social-networking system 560 may store one or more social graphs 600 in one or more data stores. In particular embodiments, social graph 600 may include multiple nodes—which may include multiple user nodes 602 or multiple concept nodes 604—and multiple edges 606 connecting the nodes. Example social graph 600 illustrated in FIG. 6 is shown, for didactic purposes, in a two-dimensional visual map representation. In particular embodiments, a social-networking system 560, client system 530, or third-party system 570 may access social graph 600 and related social-graph information for suitable applications. The nodes and edges of social graph 600 may be stored as data objects, for example, in a data store (such as a social-graph database). Such a data store may include one or more searchable or queryable indexes of nodes or edges of social graph 600.

In particular embodiments, a user node 602 may correspond to a user of social-networking system 560. As an example and not by way of limitation, a user may be an individual (human user), an entity (e.g., an enterprise, business, or third-party application), or a group (e.g., of individuals or entities) that interacts or communicates with or over social-networking system 560. In particular embodiments, when a user registers for an account with social-networking system 560, social-networking system 560 may create a user node 602 corresponding to the user, and store the user node 602 in one or more data stores. Users and user nodes 602 described herein may, where appropriate, refer to registered users and user nodes 602 associated with registered users. In addition or as an alternative, users and user nodes 602 described herein may, where appropriate, refer to users that have not registered with social-networking system 560. In particular embodiments, a user node 602 may be associated with information provided by a user or information gathered by various systems, including social-networking system 560. As an example and not by way of limitation, a user may provide his or her name, profile picture, contact information, birth date, sex, marital status, family status, employment, education background, preferences, interests, or other demographic information. In particular embodiments, a user node 602 may be associated with one or more data objects corresponding to information associated with a user. In particular embodiments, a user node 602 may correspond to one or more webpages.

In particular embodiments, a concept node 604 may correspond to a concept. As an example and not by way of limitation, a concept may correspond to a place (such as, for example, a movie theater, restaurant, landmark, or city); a website (such as, for example, a website associated with social-network system 560 or a third-party website associated with a web-application server); an entity (such as, for example, a person, business, group, sports team, or celebrity); a resource (such as, for example, an audio file, video file, digital photo, text file, structured document, or application) which may be located within social-networking system 560 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 604 may be associated with information of a concept provided by a user or information gathered by various systems, including social-networking system 560. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 604 may be associated with one or more data objects corresponding to information associated with concept node 604. In particular embodiments, a concept node 604 may correspond to one or more webpages.

In particular embodiments, a node in social graph 600 may represent or be represented by a webpage (which may be referred to as a "profile page"). Profile pages may be hosted by or accessible to social-networking system 560. Profile pages may also be hosted on third-party websites associated with a third-party system 570. As an example and not by way of limitation, a profile page corresponding to a particular external webpage may be the particular external webpage and the profile page may correspond to a particular concept node 604. Profile pages may be viewable by all or a selected subset of other users. As an example and not by way of limitation, a user node 602 may have a corresponding user-profile page in which the corresponding user may add content, make declarations, or otherwise express himself or herself. As another example and not by way of limitation, a concept node 604 may have a corresponding concept-profile page in which one or more users may add content, make declarations, or express themselves, particularly in relation to the concept corresponding to concept node 604.

In particular embodiments, a concept node 604 may represent a third-party webpage or resource hosted by a third-party system 570. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 530 to send to social-networking system 560 a message indicating the user's action. In response to the message, social-networking system 560 may create an edge (e.g., a check-in-type edge) between a user node 602 corresponding to the user and a concept node 604 corresponding to the third-party webpage or resource and store edge 606 in one or more data stores.

In particular embodiments, a pair of nodes in social graph 600 may be connected to each other by one or more edges 606. An edge 606 connecting a pair of nodes may represent a relationship between the pair of nodes. In particular embodiments, an edge 606 may include or represent one or more data objects or attributes corresponding to the relationship between a pair of nodes. As an example and not by way of limitation, a first user may indicate that a second user is a "friend" of the first user. In response to this indication, social-networking system 560 may send a "friend request" to the second user. If the second user confirms the "friend request," social-networking system 560 may create an edge 606 connecting the first user's user node 602 to the second user's user node 602 in social graph 600 and store edge 606 as social-graph information in one or more of data stores 564. In the example of FIG. 6, social graph 600 includes an edge 606 indicating a friend relation between user nodes 602 of user "A" and user "B" and an edge indicating a friend relation between user nodes 602 of user "C" and user "B." Although this disclosure describes or illustrates particular edges 606 with particular attributes connecting particular user nodes 602, this disclosure contemplates any suitable edges 606 with any suitable attributes connecting user nodes 602. As an example and not by way of limitation, an edge 606 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 600 by one or more edges 606.

In particular embodiments, an edge 606 between a user node 602 and a concept node 604 may represent a particular action or activity performed by a user associated with user node 602 toward a concept associated with a concept node 604. As an example and not by way of limitation, as illustrated in FIG. 6, a user may "like," "attended," "played," "listened," "cooked," "worked at," or "watched" a concept, each of which may correspond to an edge type or subtype. A concept-profile page corresponding to a concept node 604 may include, for example, a selectable "check in" icon (such as, for example, a clickable "check in" icon) or a selectable "add to favorites" icon. Similarly, after a user clicks these icons, social-networking system 560 may create a "favorite" edge or a "check in" edge in response to a user's action corresponding to a respective action. As another example and not by way of limitation, a user (user "C") may listen to a particular song ("Imagine") using a particular application (an online music application). In this case, social-networking system 560 may create a "listened" edge 606 and a "used" edge (as illustrated in FIG. 6) between user nodes 602 corresponding to the user and concept nodes 604 corresponding to the song and application to indicate that the user listened to the song and used the application. Moreover, social-networking system 560 may create a "played" edge 606 (as illustrated in FIG. 6) between concept nodes 604 corresponding to the song and the application to indicate that the particular song was played by the particular application. In this case, "played" edge 606 corresponds to an action performed by an external application on an external audio file (the song "Imagine"). Although this disclosure describes particular edges 606 with particular attributes connecting user nodes 602 and concept nodes 604, this disclosure contemplates any suitable edges 606 with any suitable attributes connecting user nodes 602 and concept nodes 604. Moreover, although this disclosure describes edges between a user node 602 and a concept node 604 representing a single relationship, this disclosure contemplates edges between a user node 602 and a concept node 604 representing one or more relationships. As an example and not by way of limitation, an edge 606 may represent both that a user likes and has used at a particular concept. Alternatively, another edge 606 may represent each type of relationship (or multiples of a single relationship) between a user node 602 and a concept node 604 (as illustrated in FIG. 6 between user node 602 for user "E" and concept node 604).

In particular embodiments, social-networking system 560 may create an edge 606 between a user node 602 and a concept node 604 in social graph 600. As an example and not by way of limitation, a user viewing a concept-profile page (such as, for example, by using a web browser or a special-purpose application hosted by the user's client system 530) may indicate that he or she likes the concept represented by the concept node 604 by clicking or selecting a "Like" icon, which may cause the user's client system 530 to send to social-networking system 560 a message indicating the user's liking of the concept associated with the concept-profile page. In response to the message, social-networking system 560 may create an edge 606 between user node 602 associated with the user and concept node 604, as illustrated by "like" edge 606 between the user and concept node 604. In particular embodiments, social-networking system 560 may store an edge 606 in one or more data stores. In particular embodiments, an edge 606 may be automatically formed by social-networking system 560 in response to a particular user action. As an example and not by way of limitation, if a first user uploads a picture, watches a movie, or listens to a song, an edge 606 may be formed between user node 602 corresponding to the first user and concept nodes 604 corresponding to those concepts. Although this disclosure describes forming particular edges 606 in particular manners, this disclosure contemplates forming any suitable edges 606 in any suitable manner.

Figure 7:
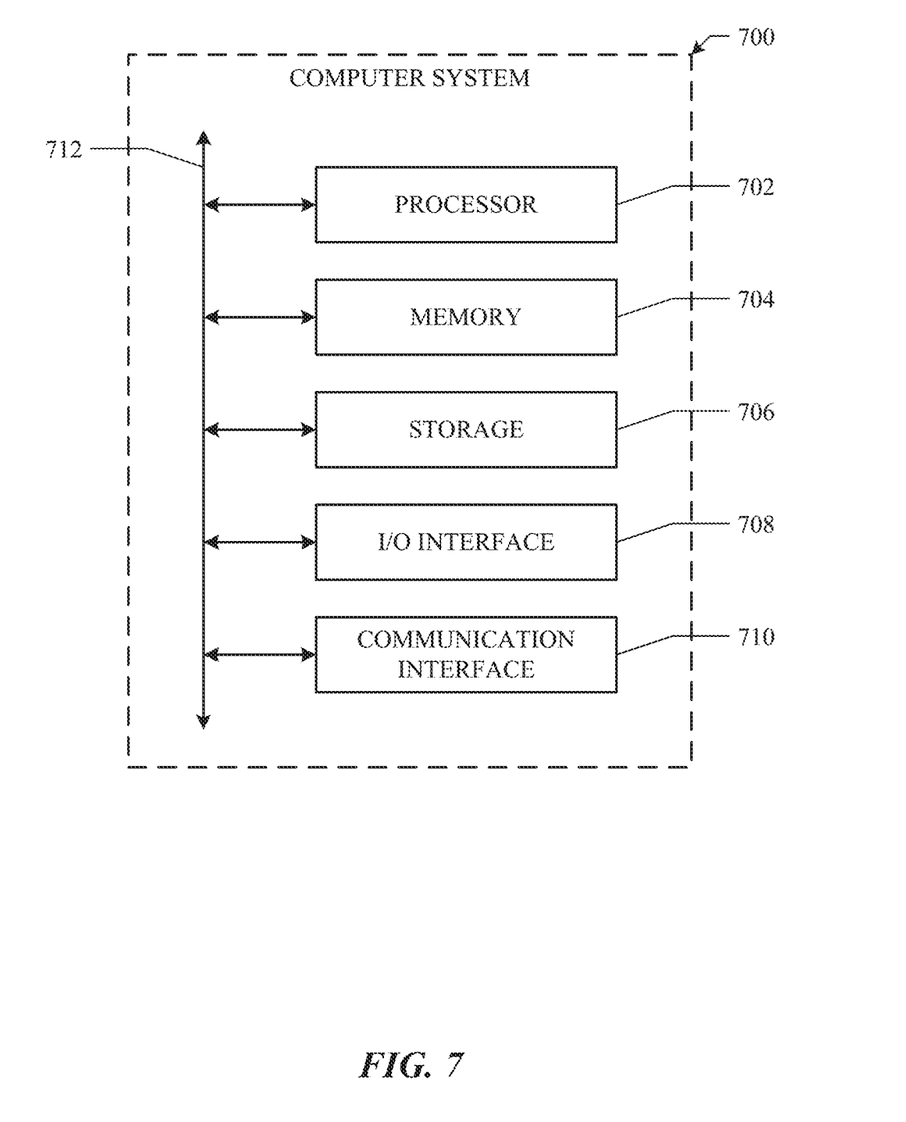
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate.

Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more processors of one or more computing devices:
   determining that a user is interacting with an input post accessing an input vector representing the input post, wherein:
     the input vector corresponds to a point in a vector space;
     the vector space comprises a plurality of clusters of training-page vectors that are each associated with a topic;
     each cluster was determined based on a clustering of a plurality of training-page vectors corresponding to a plurality of respective training pages that each comprise one or more training posts, wherein each training post was submitted by a user to a training page and comprises content selected by the user; and
     each training-page vector was generated by an artificial neural network (ANN) that was trained, based on the training posts of training pages associated with the ANN, to receive a post and then output, for each training page, a probability that the received post is related to the training posts of the training page;
   determining that the input vector representing the input post is located within a particular cluster in the vector space by calculating a similarity metric between the input vector and one or more training-page vectors in the vector space, wherein a similarity metric is calculated by measuring a distance between the input vector and one or more training-page vectors in the vector space;
   determining a topic of the input post based on the topic associated with the particular cluster that the input vector is located within; and
   providing, for display to the user, content associated with the topic of the input post.

2. The method of claim 1, wherein the plurality of training-page vectors were generated by a plurality of ANNs.

3. The method of claim 2, wherein:
   each ANN was associated with one or more of the training pages;
   each ANN was trained, based on the training posts of the training pages associated with the ANN, to receive a post and output, for each associated training page, a probability that the post is related to the training posts of the training page;
   one or more of the training pages were common pages associated with all of the ANNs;
   a particular ANN of the plurality of ANNs corresponded to the vector space and each other ANN corresponded to a respective other vector space; and
   the plurality of training-page vectors were generated by the plurality of ANNs by:
     for each training page associated with the particular ANN, generating, by the particular ANN, a training-page vector representing the training page;
     for each training page associated with each other ANN corresponding to a respective other vector space, generating, by the other ANN, an intermediate-page vector representing the training page;
     for each other ANN corresponding to a respective other vector space, determining a mapping from the other vector space to the vector space based on the training-page vectors representing the common pages generated by the particular ANN and the intermediate-page vectors representing the common pages generated by the other ANN; and
     for each intermediate-page vector, generating a training-page vector by mapping the intermediate-page vector to the vector space using the determined mapping from other vector space corresponding to the other ANN that generated the intermediate-page vector to the vector space.

4. The method of claim 3, wherein determining a mapping from the other vector space to the vector space is further based on a least square error for the training-page vectors representing the common pages generated by the particular ANN and the intermediate-page vectors representing the common pages generated by the other ANN corresponding to the other vector space.

5. The method of claim 1, wherein a post comprises:
   one or more n-grams;
   one or more videos; or
   one or more images.

6. The method of claim 1, wherein a page vector representing a page comprises a portion of a hidden layer of the ANN that generated the page vector.

7. The method of claim 1, wherein:
   each training page corresponds to a label comprising one or more n-grams; and
   determining a topic of the input post comprises determining a representative label of the training pages located in the cluster associated with the topic.

8. The method of claim 7, wherein the representative label comprises one or more n-grams most frequent among the training pages located within the particular cluster that the input vector is located within.

9. The method of claim 1, wherein determining a cluster based on the plurality of training-page vectors comprises using a hierarchical clustering model, a centroid-based clustering model, a distribution-based clustering, or a density-based clustering model.

10. The method of claim 1, wherein the probability that the received post is related to the training posts of the training page comprises a probability that the received post is semantically related to the training posts of the training page.

11. The method of claim 1, further comprising:
    ranking the input post with respect to a user based at least in part on the determined topic of the input post; and
    providing, for display to the user, the input post based on determining that the rank is at least a threshold rank.

12. The method of claim 1, wherein:
    the input post is submitted by an advertiser on an online social network and is associated with an advertisement campaign related to a topic; and
    the method further comprises:
      determining that the topic of the input post is not related to the topic of the advertisement campaign; and sending, to an administrator of the online social network, an indication that the input post is not related to the topic of the advertisement campaign.

13. One or more computer-readable non-transitory storage media embodying software that is operable when executed to:
   determine that a user is interacting with an input post;
   access an input vector representing the input post, wherein:
      the input vector corresponds to a point in a vector space;
      the vector space comprises a plurality of clusters of training-page vectors that are each associated with a topic;
      each cluster was determined based on a clustering of a plurality of training-page vectors corresponding to a plurality of respective training pages that each comprise one or more training posts, wherein each training post was submitted by a user to a training page and comprises content selected by the user; and
      each training-page vector was generated by an artificial neural network (ANN) that was trained, based on the training posts of training pages associated with the ANN, to receive a post and then output, for each training page, a probability that the received post is related to the training posts of the training page;
   determine that the input vector representing the input post is located within a particular cluster in the vector space by calculating a similarity metric between the input vector and one or more training-page vectors in the vector space, wherein a similarity metric is calculated by measuring a distance between the input vector and one or more training-page vectors in the vector space;
   determine a topic of the input post based on the topic associated with the particular cluster that the input vector is located within; and
   provide, for display to the user, content associated with the topic of the input post.

14. The media of claim 13, wherein the plurality of training-page vectors were generated by a plurality of ANNs.

15. The media of claim 14, wherein:
   each ANN was associated with one or more of the training pages;
   each ANN was trained, based on the training posts of the training pages associated with the ANN, to receive a post and output, for each associated training page, a probability that the post is related to the training posts of the training page;
   one or more of the training pages were common pages associated with all of the ANNs;
   a particular ANN of the plurality of ANNs corresponded to the vector space and each other ANN corresponded to a respective other vector space; and
   the plurality of training-page vectors were generated by the plurality of ANNs by:
      for each training page associated with the particular ANN, generating, by the particular ANN, a training-page vector representing the training page;
      for each training page associated with each other ANN corresponding to a respective other vector space, generating, by the other ANN, an intermediate-page vector representing the training page;
      for each other ANN corresponding to a respective other vector space, determining a mapping from the other vector space to the vector space based on the training-page vectors representing the common pages generated by the particular ANN and the intermediate-page vectors representing the common pages generated by the other ANN; and
      for each intermediate-page vector, generating a training-page vector by mapping the intermediate-page vector to the vector space using the determined mapping from other vector space corresponding to the other ANN that generated the intermediate-page vector to the vector space.

16. The media of claim 15, wherein determining a mapping from the other vector space to the vector space is further based on a least square error for the training-page vectors representing the common pages generated by the particular ANN and the intermediate-page vectors representing the common pages generated by the other ANN corresponding to the other vector space.

17. The media of claim 13, wherein a post comprises:
   one or more n-grams;
   one or more videos; or
   one or more images.

18. The media of claim 13, wherein a page vector representing a page comprises a portion of a hidden layer of the ANN that generated the page vector.

19. A system comprising:
   one or more processors; and
   a memory coupled to the processors and comprising instructions operable when executed by the processors to cause the processors to:
      determine that a user is interacting with an input post;
      access an input vector representing the input post, wherein:
         the input vector corresponds to a point in a vector space;
         the vector space comprises a plurality of clusters of training-page vectors that are each associated with a topic;
         each cluster was determined based on a clustering of a plurality of training-page vectors corresponding to a plurality of respective training pages that each comprise one or more training posts, wherein each training post was submitted by a user to a training page and comprises content selected by the user; and
         each training-page vector was generated by an artificial neural network (ANN) that was trained, based on the training posts of training pages associated with the ANN, to receive a post and then output, for each training page, a probability that the received post is related to the training posts of the training page;
      determine that the input vector representing the input post is located within a particular cluster in the vector space by calculating a similarity metric between the input vector and one or more training-page vectors in the vector space, wherein a similarity metric is calculated by measuring a distance between the input vector and one or more training-page vectors in the vector space;
      determine a topic of the input post based on the topic associated with the particular cluster that the input vector is located within; and
      provide, for display to the user, content associated with the topic of the input post.

* * * * *